United States Patent
Fukushima et al.

(10) Patent No.: US 6,991,751 B2
(45) Date of Patent: Jan. 31, 2006

(54) ELECTROCONDUCTIVE SILICONE PRESSURE-SENSITIVE ADHESIVE COMPOSITION

(75) Inventors: Motoo Fukushima, Usui-gun (JP); Shunji Aoki, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 175 days.

(21) Appl. No.: 10/652,074

(22) Filed: Sep. 2, 2003

(65) Prior Publication Data

US 2004/0041131 A1 Mar. 4, 2004

(30) Foreign Application Priority Data

Sep. 4, 2002 (JP) .............................. 2002-258601

(51) Int. Cl.
*H01B 1/22* (2006.01)
(52) U.S. Cl. ...................................... 252/512; 252/514
(58) Field of Classification Search ................ 252/512, 252/514

See application file for complete search history.

(56) References Cited

U.S. PATENT DOCUMENTS

| | | | | |
|---|---|---|---|---|
| 5,312,690 A | * | 5/1994 | Fukuda et al. | 428/447 |
| 6,414,078 B1 | * | 7/2002 | Fukushima et al. | 524/588 |
| 6,485,831 B1 | * | 11/2002 | Fukushima et al. | 428/403 |
| 6,815,076 B2 | * | 11/2004 | Aoki | 428/448 |

FOREIGN PATENT DOCUMENTS

| | | |
|---|---|---|
| JP | 63-22886 | 1/1988 |
| JP | 1-287169 | 11/1989 |
| JP | 2928944 | 5/1999 |
| JP | 2001-146578 | * 5/2001 |
| JP | 2002-167512 | 6/2002 |

* cited by examiner

*Primary Examiner*—Mark Kopec
(74) *Attorney, Agent, or Firm*—Oblon, Spivak, McClelland, Maier & Neustadt, P.C.

(57) ABSTRACT

A conductive powder is incorporated in a pressure-sensitive adhesive composition comprising a silicone gum, an MQ resin, and a crosslinking agent. The conductive powder consists of core particles of inorganic material or organic resin, an interlayer of silicon-base polymer, and a metal plating. The resulting conductive silicone pressure-sensitive adhesive composition is satisfactorily adherent to silicone rubber and cures into a product that exhibits stable conductivity and adhesive properties in the temperature region where silicone rubber is used.

15 Claims, No Drawings

ELECTROCONDUCTIVE SILICONE PRESSURE-SENSITIVE ADHESIVE COMPOSITION

This invention relates to electroconductive silicone pressure-sensitive adhesive compositions which have good adhesion, stable electric conductivity and stable adhesive properties, and cure into products having tight adhesion to silicone rubber and electric conductivity in a high-temperature environment where the silicone rubber is used, and are thus useful as high reliability electronic materials. As used herein, the term "conductive" is electroconductive unless otherwise stated.

BACKGROUND ART

Prior art conductive pressure-sensitive adhesives are compositions comprising an adhesive component such as an acrylic resin, a blend of acrylic resin with rosin, natural rubber or butyl rubber, in admixture with a conductive powder such as copper powder. Since these conductive pressure-sensitive adhesives are crosslinkable in a relatively low temperature range below 100° C., they can be directly applied to conductive backings such as metal foils and heated together with the conductive backings for crosslinking the conductive pressure-sensitive adhesive layers, thereby yielding conductive tape having conductive pressure-sensitive adhesive borne thereon. This suggests that these prior art conductive pressure-sensitive adhesives have a serviceable temperature range from 80° C. to 120° C. at the highest. They cannot be used at higher temperatures beyond the range because the pressure-sensitive adhesive layer will soften and substantially lose bond strength.

When it is desired to join a cable to a metal which is unsusceptible to soldering, one approach is by attaching a metal foil tape having conductive pressure-sensitive adhesive borne thereon to the surface of the metal and soldering the cable to the metal foil tape for grounding or similar purposes. Prior art pressure-sensitive adhesives cannot withstand the high temperature of soldering. If the adhesive layer of the tape softens, there is a likelihood that the tape will be shifted, the metal member to which the tape is attached fall off, or the tape as a whole be separated, thus failing to attain the grounding or similar purposes. Recently, rubber connectors featuring high conductivity and heat resistance are in increasing use. It is desired to have a heat resistant, conductive pressure-sensitive adhesive which is applicable to such rubber connectors.

To overcome the foregoing problem, an attempt has been made to employ heat resistant resins such as polysiloxane as the pressure-sensitive adhesive. Known silicone pressure-sensitive adhesives include those comprising a polysiloxane consisting essentially of $Me_3SiO_{1/2}$ units and $SiO_{4/2}$ units, known as MQ resin, and a dimethylsilicone gum, or a condensed product thereof. These adhesives are generally crosslinked with peroxides at high temperatures of 150 to 180° C. in order to enhance the bond strength or cohesion. JP-A 63-22886 discloses a low-temperature curable addition type silicone pressure-sensitive adhesive comprising an alkenyl-containing organopolysiloxane, MQ resin and Si—H radical-containing polysiloxane.

These silicone base pressure-sensitive adhesives are admixed with a metal powder as a conductive powder to formulate conductive pressure-sensitive adhesive compositions, which have the drawback that they fail to develop satisfactory conductivity unless large amounts of conductive powder having a high specific gravity are blended. Due to the difference in specific gravity, the conductive powder tends to separate from the silicone component so that the composition is inevitably poorly conductive, too viscous and inefficient to work. In this connection, JP-A 1-287169 proposes to dilute such a composition with an organic solvent to provide a silicone base pressure-sensitive adhesive composition which is reduced in viscosity buildup and efficient to work. However, the problem of unstable conductivity due to settlement and irregular dispersion of conductive powder has not been solved.

The conductive pressure-sensitive adhesive compositions obtained by admixing silicone base pressure-sensitive adhesives with a metal powder as a conductive powder suffer from problems associated with the conductive powder for imparting and developing conductivity. For instance, although silicone resins are resistant to heat at or above 200° C. in air, the conductive properties of pressure-sensitive adhesives at such temperatures apparently decline with the passage of time. That is, although silicone resins are stable in an environmental temperature region of at least 200° C., the adhesives fail to exhibit stable conductivity in the same temperature region. This is because the conductive powder used is a copper, nickel or similar metal powder which is susceptible to oxidation by heat. When exposed to a high temperature environment, the conductive powder in the form of a metal powder is oxidized by heat to invite the detrimental effect that the powder discolors or loses conductivity. When conductive pressure-sensitive adhesives are used for fixedly securing conductive silicone rubber connectors for high-reliability electronic materials, there is a desire to stabilize the conductivity of the adhesives when held at such high temperatures.

On the other hand, Japanese Patent No. 2,928,944 and JP-A 2001-146578 disclose a metal powder and a metal coated powder as conductive powders, respectively. Noble metals such as gold and platinum used as the conductive powder have both heat resistance and conductivity, but are very expensive and have a high specific gravity which gives rise to a problem of settlement over time. Thus noble metals are not commercially used in practice. Instead, silver is often used in the application where very high conductivity is required, and copper or nickel used in other applications. Copper and nickel powders are inexpensive, but when used under heated conditions, tend to form an oxide film on surfaces of particles under the influence of air-borne oxygen and moisture, detracting from conductivity. Then the silver powder which is highly conductive and less susceptible to oxidation or a metal powder in the form of copper particles surface coated with silver is often used as the conductive powder. The silver powder is still unsatisfactory because of its drawback that particles settle over time due to the high specific gravity.

For the metal-coated powder, a compromise between a low specific gravity and conductivity can be found by selecting a low specific gravity powder as core particles. However, the metal-coated powder has the problem that when exposed to high temperatures, the metal coating is stripped from the core particles on account of remarkably poor adhesion therebetween. This prohibits the use of the metal-coated powder in conductive pressure-sensitive adhesives for electronic materials requiring high reliability.

The present inventors disclosed in JP-A 2002-167512 that a conductive powder in which core particles of an inorganic material or organic resin are surface treated with a silicon-base polymer having reductive effect and over-coated with a metal by electroless plating can be used in silicone rubber requiring high reliability because the adhesion between the core particles and the metal coating is improved to a sufficient extent to eliminate the problem of the metal coating being stripped from the core particles upon exposure to high temperatures. This conductive powder has never been used in pressure-sensitive adhesives.

SUMMARY OF THE INVENTION

An object of the invention is to provide a conductive silicone pressure-sensitive adhesive composition which has satisfactory adhesion to silicone rubber or the like and exhibits stable conductivity and adhesive properties in the temperature region where silicone rubber is used.

It has been found that a conductive silicone pressure-sensitive adhesive composition which can attain the above object is obtained by dispersing a specific conductive powder in a silicone composition comprising an organopolysiloxane and another organopolysiloxane known as MQ resin as essential components. The conductive powder used herein is one in which core particles are surface treated with a silicon-base polymer having reductive effect and over-coated with a metal by plating, preferably the core particles have a specific gravity of less than or equal to 3.5, and also preferably the metal on the outermost surface of the conductive powder is a noble metal having resistance to oxidation. This conductive powder or particles do not separate from the adhesive component. Even after the silicone pressure-sensitive adhesive composition is held at high temperatures, the conductivity remains substantially stable or unchanged. In addition, the composition maintains satisfactory adhesive properties in the environmental temperature region where silicone rubber is serviceable. The present invention is predicated on this finding.

According to the invention, there is provided a conductive silicone pressure-sensitive adhesive composition comprising (A) 100 parts by weight of an organopolysiloxane having the average compositional formula (1):

$$R_a SiO_{(4-a)/2} \quad (1)$$

wherein R is independently a substituted or unsubstituted monovalent hydrocarbon radical having 1 to 10 carbon atoms, and a is a positive number of 1.95 to 2.05, (B) 50 to 250 parts by weight of an organopolysiloxane comprising structural units of the general formula (2):

$$R^1{}_3 SiO_{1/2} \quad (2)$$

wherein $R^1$ is independently a hydroxyl radical or a substituted or unsubstituted monovalent hydrocarbon radical having 1 to 10 carbon atoms and $SiO_{4/2}$ units, in a molar ratio $(R^1{}_3SiO_{1/2})/(SiO_{4/2})$ between 0.5 and 1.2, (C) 3 to 300 parts by weight per 100 parts by weight of components (A) and (B) combined of a conductive powder including core particles of an inorganic material or organic resin which are surface coated with a layer of a silicon-base polymer having reductive effect or a partially or entirely ceramic layer thereof, which is in turn surface coated with a metal by plating, and (D) an effective amount to cure component (A) of a crosslinking agent.

DESCRIPTION OF THE PREFERRED EMBODIMENTS

Component (A) in the conductive silicone pressure-sensitive adhesive composition of the invention is an organopolysiloxane having the average compositional formula (1):

$$R_a SiO_{(4-a)/2} \quad (1)$$

wherein R is independently a substituted or unsubstituted monovalent hydrocarbon radical having 1 to 10 carbon atoms, and "a" is a positive number of 1.95 to 2.05. It is a base component in the inventive composition and largely affects the strength thereof.

R which may be the same or different is selected from among substituted or unsubstituted monovalent hydrocarbon radicals having 1 to 10 carbon atoms, preferably 1 to 8 carbon atoms. Examples of suitable monovalent hydrocarbon radicals include alkyl radicals such as methyl, ethyl, propyl, butyl, hexyl and octyl, cycloalkyl radicals such as cyclohexyl, alkenyl radicals such as vinyl, allyl, propenyl, butenyl and hexenyl, aryl radicals such as phenyl, tolyl and xylyl, aralkyl radicals such as benzyl and phenethyl, and substituted ones of the foregoing radicals in which some or all hydrogen atoms attached to carbon atoms are substituted with halogen atoms, cyano radicals or the like, typically halo-substituted alkyl radicals such as 3-chloropropyl and 3,3,3-trifluoropropyl. Of these, methyl and phenyl are preferred. The subscript "a" is a positive number of 1.95 to 2.05.

In the embodiment wherein the crosslinking agent is an organohydrogenpolysiloxane/platinum group catalyst system as will be described later, R should include at least two aliphatic unsaturated radicals (typically alkenyl radicals). The content of aliphatic unsaturated radicals in R is preferably 0.01 to 10.0 mol %, and more preferably 0.025 to 5.0 mol %. Illustrative alkenyl radicals are vinyl, allyl, butenyl, pentenyl, hexenyl and heptenyl, with vinyl being most preferred. The attaching position of alkenyl radicals is not critical and they may be attached to ends or side chains of a molecular chain or both ends and side chains.

Examples of suitable organopolysiloxanes having at least two aliphatic unsaturated radicals (typically alkenyl radicals) as component (A) include, but are not limited to, both end trimethylsiloxy radical-blocked dimethylsiloxane/methylvinylsiloxane copolymers, both end trimethylsiloxy radical-blocked methylvinylpolysiloxane, both end trimethylsiloxy radical-blocked methylvinylsiloxane/diphenylsiloxane copolymers, both end trimethylsiloxy radical-blocked dimethylsiloxane/methylvinylsiloxane/diphenylsiloxane copolymers, both end dimethylvinylsiloxy radical-blocked dimethylpolysiloxane, both end dimethylvinylsiloxy radical-blocked methylvinylpolysiloxane, both end dimethylvinylsiloxy radical-blocked methylphenylpolysiloxane, both end dimethylvinylsiloxy radical-blocked dimethylsiloxane/methylvinylsiloxane copolymers, both end dimethylvinylsiloxy radical-blocked dimethylsiloxane/methylphenylsiloxane copolymers, both end dimethylvinylsiloxy radical-blocked dimethylsiloxane/diphenylsiloxane copolymers, both end silanol radical-blocked dimethylsiloxane/methylvinylsiloxane copolymers, both end silanol radical-blocked dimethylsiloxane/diphenylsiloxane copolymers, both end silanol radical-blocked methylvinylpolysiloxane, and both end silanol radical-blocked dimethylsiloxane/methylvinylsiloxane/methylphenylsiloxane copolymers.

In the other embodiment wherein the crosslinking agent is an organic peroxide as will be described later, suitable organopolysiloxanes include the above-mentioned organopolysiloxanes having alkenyl radicals and organopolysiloxanes free of aliphatic unsaturated radicals (typically alkenyl radicals). Illustrative of the latter are both end trimethylsiloxy radical-blocked dimethylsiloxane, both end trimethylsiloxy radical-blocked dimethylsiloxane/diphenylsiloxane copolymers, both end silanol radical-blocked dimethylsiloxane, both end silanol radical-blocked methylphenylpolysiloxane, and both end silanol radical-blocked dimethylsiloxane/diphenylsiloxane copolymers.

The molecular structure of organopolysiloxane (A) is preferably a straight chain or a partially branched straight chain. As component (A), a single organopolysiloxane or a mixture of organopolysiloxanes having different degrees of polymerization or molecular structures may be used.

Preferably the organopolysiloxane (A) has a degree of polymerization of at least 100, more preferably 200 to 100,000, as $R_aSiO_{(4-a)/2}$ units. A degree of polymerization of less than 100 may lead to poor adhesive properties, failing to achieve the objects of the invention.

Also preferably the organopolysiloxane (A) has a viscosity of at least 2,000 centipoises, more preferably at least 100,000 centipoises. Illustratively, an organopolysiloxane in the form commonly referred to as "silicone gum" is preferred.

Component (B) is an organopolysiloxane comprising structural units of the general formula (2):

$$R^1_3SiO_{1/2} \qquad (2)$$

wherein $R^1$ is independently a hydroxyl radical or a substituted or unsubstituted monovalent hydrocarbon radical having 1 to 10 carbon atoms and $SiO_{4/2}$ units, in a molar ratio $(R^1_3SiO_{1/2})/(SiO_{4/2})$ between 0.5 and 1.2. It is a component for imparting adhesive properties and generally known as "MQ resin."

In formula (2), $R^1$ which may be the same or different is a hydroxyl radical or a substituted or unsubstituted monovalent hydrocarbon radical having 1 to 10 carbon atoms. It is preferred that hydroxyl radicals (silanol radicals) be present in admixture with monovalent hydrocarbon radicals. Suitable monovalent hydrocarbon radicals are as exemplified for R in formula (1). The substituent radicals $R^1$ in a molecule may be all the same or include some different radicals. Methyl and vinyl radicals are preferred. Most preferably, methyl accounts for at least 95 mol % of the entire $R^1$.

The molar ratio of $R^1_3SiO_{1/2}$ units to $SiO_{4/2}$ units is from 0.5/1 to 1.2/1, preferably from 0.65/1 to 0.95/1. A ratio of less than 0.5 may lead to low tack or adhesive strength whereas a ratio of more than 1.2 may lead to a low cohesion.

If desired, the organopolysiloxane (B) may further contain $R^1_2SiO_{2/2}$ units and $R^1SiO_{3/2}$ units insofar as these additional units do not adversely affect the desired adhesive properties. As component (B), such organopolysiloxanes may be used alone or in admixture of any.

An appropriate amount of component (B) blended is 50 to 250 parts by weight, preferably 100 to 200 parts by weight per 100 parts by weight of component (A).

Component (C) is a conductive powder including core particles of an inorganic material or organic resin which are surface coated with a layer of a silicon-base polymer having reductive effect or a partially or entirely ceramic layer thereof, which is in turn surface coated with a metal by plating. It is a component for imparting electric conductivity. Metal-coated particles having a low specific gravity, high heat resistance and high conductivity are used as the conductive powder to formulate a silicone composition, which becomes highly stable and thus suitable for use as electronic materials for insuring high reliability.

The core particles serving as nuclei are made of an inorganic material or organic resin, which is preferably resistant to heat at or above 200° C.

The core particles may take any desired shape including spherical, rod, needle, hollow and irregular shapes as long as they are apparently handled as particles or powder. From the standpoints of dispersion and cost reduction, spherical particles are preferred because the coating weight of noble metal on the outermost surface is minimized Preferably the core particles have an average particle size of 0.1 to 500 μm, more preferably 1 to 100 μm. Particles with an average particle size of less than 0.1 μm have a larger specific surface area which requires a larger quantity of plating metal and increases the expense, leading to an economical disadvantage. Particles with an average particle size of more than 500 μm are difficult to mix with the matrix and reveal themselves as irregularities on the surface of a cured product.

The core particles should preferably have a specific gravity of up to 3.5, specifically 0.5 to 3.5, with a specific gravity of 0.6 to 3.0 being more preferred. Particles with a specific gravity of less than 0.5 may have so thin a wall that they become mechanically collapsible. If the core's specific gravity is more than 3.5, metal-coated particles may have a greater specific gravity than the polysiloxanes, incurring a likelihood that the metal-coated particles in the pressure-sensitive adhesive composition will separate and settle with the passage of time.

Exemplary powders of inorganic materials include metal powders, metal or non-metallic oxides, metal silicate salts inclusive of aluminosilicate, metal carbides, metal nitrides, metal acid salts, metal halides and carbon. More illustrative examples include silica, alumina, alumina silicate, talc, mica, silicate balloons ("Silas Balloon"), graphite, glass fibers, silicon fibers, carbon fibers, asbestos, potassium titanate whiskers, zinc white, aluminum nitride, magnesium oxide and boron nitride.

Exemplary powders of organic resins include powdered insulating resins such as phenolic resins, polyester resins, epoxy resins, polyamide resins, polyimide resins, acrylate resins, acrylonitrile resins, urethane resins, polyacetal resins, alkyd resins, melamine resins, silicone resins, fluoro-resins, polyethylene resins, polypropylene resins, polybutene resins, polystyrene resins, polyvinyl chloride resins, poly(diaryl phthalate) resins, polyxylene resins polyvinyl alcohol, and polycarbonate; and powdered low conductive resins such as polyaniline resins, polyacetylene resins, polythiophene resins and polypyrrole resins. If desired, these resins may be heat treated into carbon.

Especially for use as electronic materials requiring high reliability, core particles of inorganic material which is devoid of ionic metals and thermally stable are preferred. Inter alia, silica is more preferred because it is highly compatible with silicon base polymers. Especially to reduce the specific surface area, particles which are devoid of internal cells open to the surface are desired, with particles of fused quartz being most desired.

In order to provide the low specific gravity conductive powder which will not settle down due to a minimum specific gravity difference when dispersed in organopolysiloxane, hollow particles are preferred. Hollow particles serving as cores may be either hollow inorganic particles or hollow organic particles having heat resistance. Hollow glass particles are commercially available under the trade name of Cel-star (Tokai Industry Co., Ltd.), Scotchlite (3M Co.), and Hollow Glass Beads (Potters Ballotini Co., Ltd.). Hollow aluminosilicate particles are commercially available under the trade name of E-Spheres (Chichibu-Onoda Co., Ltd.), Fillite (Nippon Fillite Co., Ltd.), and Silas Balloon (Marunakahakudo Co., Ltd.). Heat resistant hollow organic particles are commercially available under the trade name of Phenoset (Tomoe Industry Co., Ltd., made of phenolic resin).

The conductive powder is obtained by forming a silicon-base polymer layer having reductive effect on surfaces of core particles, and coating the outer surface of the silicon-base polymer layer with a metal by plating. Preferably, the silicon-base polymer layer is then partially or entirely converted to be ceramic. The formation of a silicon-base polymer layer having reductive effect on surfaces of core particles improves the interfacial adhesion stability between the core particles and the metal coating, The formation of a silicon-base polymer layer having reductive effect on surfaces of core particles may be done, for example, by treating core particles with a silicon-base polymer having reductive effect to form a reductive silicon-base polymer layer on surfaces of the core particles.

The silicon-base polymer having reductive effect includes silicon-base polymers having Si—Si bonds or Si—H bonds, for example, polysilanes, polycarbosilanes, polysiloxanes and polysilazanes. Inter alia, polysilanes and polysiloxanes having hydrogen atoms directly attached to silicon atoms are preferred. Especially preferred for use herein are polysilanes of the general formula (3):

wherein each of $R^2$ and $R^3$ which may be the same or different is hydrogen or a substituted or unsubstituted monovalent hydrocarbon radical; X is a radical as defined for $R^2$, an alkoxy radical, halogen atom, oxygen atom or nitrogen atom; and the subscripts b, c and d are numbers satisfying $0.1 \leq b \leq 2$, $0 \leq c \leq 1$, $0 \leq d \leq 0.5$, and $1 \leq b+c+d \leq 2.5$, and e is an integer of 4 to 100,000.

More particularly, $R^2$ and $R^3$ are independently selected from among hydrogen and substituted or unsubstituted monovalent hydrocarbon radicals, examples of which include aliphatic or cycloaliphatic hydrocarbon radicals having 1 to 12 carbon atoms, preferably 1 to 6 carbon atoms and aromatic hydrocarbon radicals having 6 to 14 carbon atoms, preferably 6 to 10 carbon atoms. Exemplary aliphatic or cycloaliphatic hydrocarbon radicals include methyl, ethyl, propyl, butyl, pentyl, hexyl, cyclopentyl and cyclohexyl. Exemplary aromatic hydrocarbon radicals include phenyl, tolyl, xylyl, naphthyl and benzyl. Also included are substituted ones of the foregoing hydrocarbon radicals in which some or all hydrogen atoms are substituted with halogen atoms, alkoxy radicals, amino radicals or aminoalkyl radicals, such as monofluoromethyl, trifluoromethyl, and m-dimethylaminophenyl.

X is a radical as defined for $R^2$, an alkoxy radical, halogen atom, oxygen atom or nitrogen atom. Suitable alkoxy radicals include those of 1 to 4 carbon atoms, such as methoxy, ethoxy and isopropoxy. Suitable halogen atoms are fluorine, chlorine and bromine. Most preferably X is methoxy or ethoxy.

The subscript b is a number in the range $0.1 \leq b \leq 2$, preferably $0.5 \leq b \leq 1$, c is a number in the range $0 \leq c \leq 1$, preferably $0.5 \leq c \leq 1$, d is a number in the range $0 \leq d \leq 0.5$, preferably $0 \leq d \leq 0.2$, satisfying $1 \leq b+c+d \leq 2.5$, preferably $1.5 \leq b+c+d \leq 2$. The subscript e is an integer of 4 to 100,000, preferably 10 to 10,000.

Also preferred for use herein are polysilanes of the general formula (4):

wherein each of $R^4$ and $R^5$ which may be the same or different is hydrogen, a substituted or unsubstituted monovalent hydrocarbon radical, an alkoxy radical or a halogen atom; and the subscripts f, g, h and i are numbers satisfying $0.1 \leq f \leq 2$, $0 \leq g \leq 1$, $0.01 \leq h \leq 1$, $0.5 \leq i \leq 1.95$, and $2 \leq f+g+h+i \leq 3.5$, and j is an integer of 2 to 100,000.

More particularly, $R^4$ and $R^5$ are independently selected from among hydrogen, substituted or unsubstituted monovalent hydrocarbon radicals, alkoxy radicals and halogen atoms. Examples of suitable monovalent hydrocarbon radicals include aliphatic or cycloaliphatic hydrocarbon radicals having 1 to 12 carbon atoms, preferably 1 to 6 carbon atoms and aromatic hydrocarbon radicals having 6 to 14 carbon atoms, preferably 6 to 10 carbon atoms. Exemplary aliphatic or cycloaliphatic hydrocarbon radicals include methyl, ethyl, propyl, butyl, pentyl, hexyl, cyclopentyl and cyclohexyl. Exemplary aromatic hydrocarbon radicals include phenyl, tolyl, xylyl, naphthyl and benzyl. Also included are substituted ones of the foregoing hydrocarbon radicals in which some or all hydrogen atoms are substituted with halogen atoms, alkoxy radicals, amino radicals or aminoalkyl radicals, such as monofluoromethyl, trifluoromethyl, and m-dimethylaminophenyl. Suitable alkoxy radicals include those of 1 to 4 carbon atoms, such as methoxy, ethoxy and isopropoxy. Suitable halogen atoms are chlorine and bromine. Inter alia, methoxy and ethoxy are most preferred.

The subscript f is a number in the range $0.1 \leq f \leq 2$, preferably $0.5 \leq f \leq 1$, g is a number in the range $0 \leq g \leq 1$, preferably $0.5 \leq g \leq 1$, h is a number in the range $0.01 \leq h \leq 1$, preferably $0.1 \leq h \leq 1$, i is a number in the range $0.5 \leq i \leq 1.95$, preferably $1 \leq i \leq 1.5$, satisfying $2 \leq f+g+h+i \leq 3.5$, preferably $2 \leq f+g+h+i \leq 3.2$. The subscript j is an integer of 2 to 100,000, preferably 10 to 10,000.

The silicon-base polymer layer preferably has a thickness of 0.0001 to 1.0 μm, more preferably 0.001 to 0.5 μm. A polymer layer having a thickness below 0.0001 μm may fail to receive a plating metal layer in tight adhesion whereas a polymer layer of more than 1.0 μm thick may achieve little additional improvement despite an increased expense.

The plating or coating metal is preferably comprised of metals such as nickel, copper, silver, cobalt, tungsten, iron, zinc, gold, platinum and palladium. These metals may be used alone or as alloys containing at least one thereof, for example, Ni—Co, Ni—W, Ni—Fe, Co—W, Co—Fe, Ni—Cu, Ni—P, Au—Pd, Au—Pt, and Pd—Pt. In forming an alloy coating, a plating solution containing a plurality of metal salts may be used.

As defined above, the conductive powder serving as component (C) includes core particles which are surface coated with a silicon-base polymer layer, which is in turn surface coated with a metal layer. The metal layer on top may be a single metal layer. Preferably the metal layer consists of sequentially deposited first (underlying) and second (overlying) metal layers. Most preferably the second metal layer presenting the outermost surfaces is a noble metal layer.

In a preferred embodiment of the conductive powder, the first metal layer is formed of a metal selected from among nickel, copper, silver and cobalt and the second metal layer is formed of a metal selected from among silver, gold, palladium and platinum. In the most preferred embodiment, the first metal layer is nickel and the second metal layer is gold, that is, the metal-coated powder has a four-layer structure of core/silicon-base polymer layer/nickel layer/gold layer. The reason is that gold is adequate as the second metal layer defining the outermost surface of coated particles because gold has a higher conductivity among noble metals and experiences no increase of resistivity through oxidation or sulfidation when long held in a hot humid atmosphere; and nickel is adequate as the first metal layer because nickel has low cost, corrosion resistance and appropriate hardness and serves as an underlying layer to secure the second metal layer in a steady manner.

The thickness of the metal layer is preferably 0.01 to 10.0 μm, more preferably 0.1 to 2.0 μm. A metal layer having a thickness of less than 0.01 μm may fail to entirely cover the particle surface or to provide a sufficient hardness or corrosion resistance. A thickness of more than 10.0 μm implies an increased quantity of metal, resulting in coated particles with an increased expense and an increased specific gravity. Where the metal layer consists of two layers, the first and second metal layers preferably have a thickness of 0.1 to 1.9 μm and 0.01 to 1.0 μm, respectively. In the preferred conductive powder (C), the silicon-base polymer layer has been converted to a partially or entirely ceramic layer.

The conductive powder (C) may be prepared by the following procedure. In a first step, core particles are treated with a solution of a reductive silicon-base polymer in an aromatic hydrocarbon solvent such as toluene or xylene to form a layer of the reductive silicon-base polymer on the surfaces of the core particles. The coated particles are dispersed in a coagulation-free state. In a second step, the particles are treated with a salt of a metal having a standard oxidation-reduction potential of at least 0.54 V such as palladium chloride whereby colloidal metal is deposited on the reductive silicon-base polymer layer, yielding colloidal metal-bearing particles. In a third step, the particles are treated with an electroless plating solution whereby a (first) metal layer is deposited on the surfaces of coated particles. If necessary, this is followed by treatment with another electroless plating solution or an electroplating solution to deposit a second metal layer. There result metal-coated particles which constitute a conductive powder as a whole. If necessary and often desirably, the resulting conductive powder is heat treated at a temperature of 200° C. or higher to convert the reductive silicon-base polymer partially or entirely into a ceramic state.

The third step is described in more detail. After the second step, colloidal metal-bearing particles are subjected to electroless plating to form a first metal layer. The electroless plating solution contains a plating metal salt liquid and a reducing agent liquid as essential components and a complexing agent, a pH adjusting agent, a surfactant and the like as optional components.

The plating metal salt liquid contains a salt of a metal selected from the plating metals described above. Exemplary reducing agents include sodium hypophosphite, formalin, hydrazine, and sodium boron hydride. A typical pH adjusting agent is sodium acetate. Exemplary complexing agents include phenylenediamine and sodium potassium tartrate.

Depending on a particular combination of the plating metal salt with the reducing agent, the ratio at which they are mixed varies over a wide range. Often the reducing agent is used in excess of the metal salt because the reducing agent is consumed through ineffective decomposition by oxidation or the like and typically, in a molar amount of 1.1 to 5 times more than the moles of the metal salt. Usually, electroless plating baths are commercially marketed and available at a reasonable price.

The plating temperature is generally in the range of 15 to 100° C. A temperature of 40 to 95° C. is preferred because of a high rate of metal ion diffusion in the bath, a high covering power of the plating metal, and relatively reduced losses through volatilization of solvent and other components from the bath. A temperature of 65 to 85° C. is most preferred. Below 40° C., the plating reaction may proceed very slowly and become impractical. Above 95° C., the solvent which is water in most cases can evaporate off rapidly and so, the bath management may become difficult.

After the first metal layer is formed in this way, a second metal layer of an oxidation resistant noble metal is formed. It is recommended that the second metal layer be formed before the first metal layer is oxidized. In forming the noble metal layer, use may be made of an electroless plating solution which is prepared as above. The metal used in the plating solution is a metal alone such as gold, platinum, palladium or silver or an alloy thereof such as Au—Pd, Au—Pt or Pd—Pt. Of these, gold is most preferred for stability and silver is most preferred from the economical standpoint.

Any desired one of electroless plating, electroplating and displacement plating methods may be employed in forming the second metal layer or surface coating on the first metal layer-bearing particles. The electroless plating method can be carried out as in the third step described above.

After the completion of the foregoing steps, thorough washing may be carried out to remove the unnecessary metal salt, reducing agent, complexing agent, surfactant and the like.

Finally, the metal-coated particles are preferably heat treated in an inert gas (e.g., argon, helium, nitrogen) or a reducing gas (e.g. hydrogen, argon-hydrogen, ammonia) at a temperature of at least 150° C. Appropriate conditions of the inert or reducing gas treatment include a temperature of 200 to 900° C. and a time of 1 minute to 24 hours, more preferably a temperature of 200 to 500° C. and a time of 30 minutes to 4 hours. This heat treatment converts the reductive silicon-base polymer between the core and the metal layer partially or entirely into a ceramic state, acquiring greater heat resistance, insulation and adhesion. The heat treatment in a reducing atmosphere such as hydrogen is effective for minimizing the oxide in the metal layer and converting the silicon-base polymer into a stable structure, thus yielding a powder in which the metal layer is strongly bound to the core particles and which exhibits a high conductivity in a stable manner.

An appropriate amount of the conductive powder (C) blended is in a range of 3 to 300 parts by weight, preferably 5 to 200 parts by weight per 100 parts by weight of components (A) and (B) combined.

Component (D) is a crosslinking agent which is used in an effective amount to cure component (A). The preferred crosslinking agent (D) comprises an organohydrogenpolysiloxane containing at least two silicon atom-bonded hydrogen atoms in a molecule and a platinum group catalyst, or an organic peroxide.

The organohydrogenpolysiloxane combined with the platinum group catalyst functions as the crosslinking agent. Crosslinking takes place through hydrosilylation reaction between hydrogen atoms attached to silicon atoms and alkenyl radicals in the organopolysiloxane (A). The organohydrogenpolysiloxane used herein preferably contains at least two hydrogen atoms directly attached to silicon atoms in a molecule, with those represented by the average compositional formula (5) being more preferred.

$$R^6_s H_t SiO_{(4-s-t)/2} \tag{5}$$

Herein $R^6$ is a radical as defined for R. Preferably free of aliphatic unsaturation, and the subscripts s and t are numbers in the range: $0 \leq s < 3$, $0 < t < 3$ and $0 < s+t < 3$. Illustrative preferred examples are given below by the general formulae wherein Me is methyl.

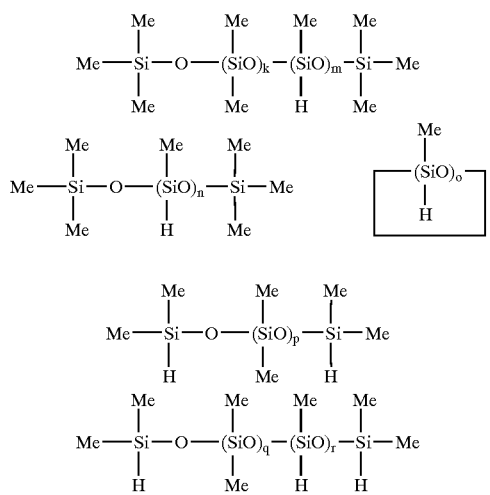

Note that k, m, n, p, q and r each are an integer of at least 2, and o is an integer of at least 3.

Also useful are hydrogenpolysiloxanes containing $Me_2HSiO_{1/2}$ units and/or $MeHSiO_{2/2}$ units and further containing units of at least one type selected from among $Me_3SiO_{1/2}$ units, $Me_2SiO_{2/2}$ units, $(C_6H_5)_2SiO_{2/2}$ units, $MeSiO_{3/2}$ units, $(C_6H_5)SiO_{3/2}$ units and $SiO_{4/2}$ units.

The organohydrogenpolysiloxanes may be used alone or in admixture of two or more. The preferred amount of organohydrogenpolysiloxane blended is such that the ratio of the total number or total molar number of silicon atom-attached hydrogen atoms (represented by "H") to the total molar number of alkenyl radicals in the organopolysiloxane (A) (represented by "Vi"), that is, H/Vi is from 0.1 to 15, especially from 1 to 10. A ratio H/Vi of less than 0.1 may lead to a lower crosslinking density and a lower cohesion. Then, when heated, the pressure-sensitive adhesive will foam by way of cracking of component (A). A ratio H/Vi of more than 15 may lead to a lower tack or adhesion, allowing for foaming by hydrogen gas liberated.

The platinum group catalyst is a catalyst for promoting hydrosilylation reaction. The catalyst may be metallic platinum or platinum compounds. Examples include chloroplatinic acid, complexes of chloroplatinic acid with olefins, and complexes of chloroplatinic acid with vinylsiloxanes. The catalyst is preferably added in amounts of 1 to 5,000 ppm, especially 5 to 2,000 ppm based on the total weight of components (A) to (C). Less than 1 ppm of the catalyst may lead to a lower crosslinking density and a lower cohesion. More than 5,000 ppm of the catalyst may lead to a lower tack or adhesion, a shortened pot life and an economical disadvantage. For the purpose of extending the pot life, any of ethynyl compounds, amine compounds and phosphorus compounds may be added as an addition reaction (hydrosilylation reaction) inhibitor.

Suitable organic peroxides include benzoyl peroxide, cumyl peroxide, t-butylcumyl peroxide, t-butyl peroxide, 2,4-dichlorobenzoyl peroxide, t-butyl peroxy isobutyrate, t-butyl peroxy benzoate, t-butyl peroxy 2-ethylhexanoate, 2,2-bis(t-butylperoxy)octane, 1,1-bis(t-butylperoxy)cyclohexane, and 2,5-dimethyl-2,5-di(benzoylperoxy)-hexane. These organic peroxides may be used alone or in admixture as the crosslinking agent (D). The amount of organic peroxide used is preferably 0.5 to 5% by weight, more preferably 1 to 3% by weight based on the total weight of components (A) to (C). Less than 0.5 wt % of the organic peroxide may lead to a lower crosslinking density and a lower cohesion. More than 5 wt % of the organic peroxide may lead to a lower tack or adhesion and leave more decomposed residues of peroxide.

In the inventive composition, other additives such as dispersants, flame retardants, heat resistant improvers and colorants may be added if necessary and as long as they do not compromise the objects of the invention.

The pressure-sensitive adhesive composition of the invention is prepared by first mixing components (A) and (B) at 25 to 150° C. for 1 to 48 hours for reaction to take place. An alkali condensation catalyst and a diluent solvent may be used during the mixing. A mere mixture of components (A) and (B) is also acceptable. The mixture or reaction mixture is then combined with components (C) and (D) to form the desired composition.

The pressure-sensitive adhesive composition of the invention may be used without a solvent or after dilution with a solvent for the purposes of facilitating coating operation and controlling film thickness. Suitable solvents include toluene, xylene, ethylbenzene, hexane, heptane, octane, hexamethyldisiloxane, octamethylcyclotetrasiloxane, ethyl acetate and methyl ethyl ketone.

The thus obtained pressure-sensitive adhesive composition is applied to one surface or opposite surfaces of various backings and cured to form a pressure-sensitive adhesive layer or layers which exhibit improved adhesive properties. The backings to which the inventive composition is applicable include, but are not limited to, silicone rubber sheets, plastic films of polyester, polytetrafluoroethylene, polyimide, polyamide, polyether ether ketone, polyphenylene sulfide and the like, sheets of Japanese paper and synthetic paper, fabrics, glass wool, glass cloth and metal foil.

Curing conditions include a temperature of 100 to 130° C. and a time of 1 to 3 minutes in the event the crosslinking agent is an organohydrogenpolysiloxane/platinum group catalyst system, or a temperature of 130 to 200° C. and a time of 1 to 15 minutes in the event the crosslinking agent is an organic peroxide.

The conductive silicone pressure-sensitive adhesive composition of the invention exhibits satisfactory adhesion to silicone rubber or the like and cures into a product which exhibits a stable conductivity and adhesive properties in the temperature region where silicone rubber is used. Since a metal-coated powder having a low specific gravity, high heat resistance and high conductivity is used as the conductive ingredient, the inventive composition provides highly stable performance and is suitable for use as an electronic material requiring high reliability. In particular, the inventive composition is suited as heat resistant pressure-sensitive adhesive tape for use in fixedly securing conductive silicone rubber connectors and in electrical connection to film heaters, shields against unwanted leakage electromagnetic waves radiated from digital units in electric and electronic equipment, film heaters and the like.

EXAMPLE

Synthesis Examples, Examples and Comparative Examples are given below for further illustrating the present invention. Examples are not to be construed as limiting the invention thereto. All parts and percents are by weight, unless otherwise stated. The viscosity is a measurement at 25° C., and Me is methyl.

Synthesis Example 1

Synthesis of Silicon-base Compound (Polysilane)

Phenylhydrogenpolysilane (abbreviated as PPHS, hereinafter) was prepared by the following procedure.

In an argon-purged flask, methyl lithium in diethyl ether was added to a THF solution of bis(cyclopentadienyl)dichlorozirconium. By effecting reaction at room temperature for 30 minutes and distilling off the solvent in vacuum, a catalyst was prepared in situ. To the catalyst, phenyltrihydrosilane was added in a molar amount of 10,000 times the moles of the catalyst. With stirring continued, the mixture was heated at 100–150° C. for 3 hours and then at 200° C. for 8 hours. The resulting product was dissolved in toluene and washed with aqueous hydrochloric acid for deactivating and removing the catalyst. Magnesium sulfate was added to the toluene solution to remove the water, followed by filtration. In this way, PPHS having a weight average molecular weight of 1,200 and a glass transition temperature of 65° C. was produced in a substantially quantitative manner.

Synthesis Example 2

1st Step (Treatment of Hollow Particles with Silicon-base Compound)

The hollow core particle powder used was a spherical hollow particulate glass powder Cel-star PZ-6000 (trade name by Tokai Industry Co., Ltd., average particle size 40 $\mu$m, true specific gravity 0.75). The powder was used after removing fragments into which particles had been broken and non-hollow particles through sedimentation.

PPHS, 0.5 g, was dissolved in 200 g of toluene, which solution was added to 100 g of the hollow powder and agitated for one hour. The powder was dried by evaporating off the toluene on a rotary evaporator at a temperature of 60° C. and a pressure of 45 mmHg. Note that the polysilane-treated powder was made hydrophobic. With stirring, 100 g of the PPHS-treated powder was added to 50 g of a 0.5% aqueous solution of Surfynol 504 (trade name by Nisshin Chemical Industry Co., Ltd.) as a surfactant for dispersing the powder in water. A water dispersion of the PPHS-treated powder was obtained.

2nd Step (Preparation of Colloidal Palladium-bearing Powder)

To 150 g of the water dispersion of PPHS-treated powder was added 70 g of a 1% aqueous solution of $PdCl_2$ (containing 0.7 g of palladium chloride or 0.4 g of palladium). This mixture was agitated for 30 minutes, followed by filtration and water washing. These treatments yielded a colloidal palladium-bearing powder in which colloidal palladium deposited on surfaces of particles to color them blackish gray.

3rd Step (Nickel Plating)

Immediately after the colloidal palladium-bearing powder was isolated by filtration and washed with water, plating was carried out. The reductive solution for nickel plating was 100 g of a mixed solution containing 2.0 M sodium hypophosphite, 1.0 M sodium acetate and 0.5 M glycine, diluted with deionized water.

The colloidal palladium-bearing powder was dispersed in the nickel plating reductive solution together with 0.5 g of antifoamer KS-538 (trade name by Shin-Etsu Chemical Co., Ltd.). With stirring, the solution was heated from room temperature to 65° C. To the reductive solution, 2.0 M sodium hydroxide diluted with deionized water was added dropwise while carrying it on air. As the same time, 1.0 M nickel sulfate diluted with deionized water was added dropwise while carrying it on nitrogen gas. Then the particles turned black while fine bubbles evolved. There was obtained a Ni-plated powder in which metallic nickel deposited on the entire surfaces of particles.

Silver Plating

The Ni-plated powder was dispersed in 100 g of a silver plating solution S-700 (trade name by Kojundo Chemical Lab. Co., Ltd.). With stirring, the solution was heated from room temperature to 70° C. Then the particles turned silver color while fine bubbles evolved. There was obtained a powder in which silver deposited on surfaces of particles. The particles floating in the plating solution were collected by filtration, washed with water and dried at 50° C. for 30 minutes. Subsequent firing at 200° C. for one hour in a hydrogen-purged electric furnace yielded an Ag/Ni-plated powder.

An observation of the Ag/Ni-plated powder under a stereomicroscope revealed that the entire surface of each particle was covered with silver. The plated particles were spherical and silver color in outer appearance as observed under a microscope, and had a specific gravity of 1.1. The metal contents were 10 wt % silver and 30 wt % nickel.

The resistivity of the Ag/Ni-plated powder as the conductive powder was determined by charging a cylindrical cell with the powder, the cell having a pair of terminals at opposed ends thereof and a pair of 0.2 cm spaced apart terminals at the center thereof, conducting a current flow of 1 to 10 mA between the opposed terminals (area 0.2 $cm^2$) from a current source SMU-257 (Keithley Instruments, Inc.), and measuring a voltage drop between the center terminals using a nanovoltmeter Model 20000 (Keithley Instruments, Inc.). The resistivity was 3.5 m$\Omega$·cm.

Synthesis Example 3

Preparation of Silver-plated Silica Powder

The procedure of Synthesis Example 2 was repeated except that a spherical silica powder US-10 (trade name by Mitsubishi Rayon Co., Ltd., average particle size 10 $\mu$m, true specific gravity 2.2) which had a narrow particle size distribution as a result of classification was used instead of the hollow particle powder. Fast plating reaction took place, yielding an adequately plated powder.

The plated particles were spherical and silver color in outer appearance, and had a specific gravity of 2.9. The metal contents were 12 wt % silver and 20 wt % nickel. The resistivity was 1.2 m$\Omega$·cm.

Synthesis Example 4

Preparation of Gold-plated Silica Powder

The procedure of Synthesis Example 3 was repeated except that a gold plating solution was used instead of the silver plating solution. A gold plating solution K-24N (trade name by Kojundo Chemical Lab. Co., Ltd.), 100 g, was used without dilution. The Ni-plated powder in which metallic nickel deposited on the entire surfaces of silica particles was dispersed in the gold plating solution. With stirring, the solution was heated from room temperature to 95° C. Then the particles turned gold color while fine bubbles evolved. There was obtained a powder in which gold deposited on surfaces of particles. There was obtained an Au/Ni-plated silica powder.

The plated particles were yellow in outer appearance by microscopic observation, and had a specific gravity of 3.1. The metal contents were 4 wt % gold and 35 wt % nickel. The resistivity was 3.0 mΩ·cm.

Examples and Comparative Examples

Pressure-sensitive adhesive compositions were prepared using the following components (1) to (4).
(1) a both end dimethylvinylsiloxy radical-blocked dimethylsiloxy/vinylmethylsiloxypolysiloxane copolymer (vinyl content 0.05 mol %, relative viscosity 2.8), referred to as silicone gum, hereinafter.
(2) a methylpolysiloxane copolymer consisting of $Me_3SiO_{1/2}$ units and $SiO_{4/2}$ units in a molar ratio of 0.85/1 and having a weight average molecular weight of 6,000, referred to as MQ resin, hereinafter.
(3) The conductive powder used was silver-plated hollow glass powder (Synthesis Example 2), silver-plated silica powder (Synthesis Example 3), gold-plated silica powder (Synthesis Example 4), silver powder 3050HD (trade name by Mitsui Metal Mining and Smelting Co., Ltd., specific gravity 10.5), or silver-plated glass powder (made by Toshiba Tungaloy Co., Ltd., specific gravity 2.7).
(4) The crosslinking agent used was a combination of (4-1) both end trimethylsiloxy radical-blocked methylhydrogenpolysiloxane (Si—H bonding hydrogen atom content 1.5 wt %, average compositional formula $Me_3SiO(MeH-SiO)_{38}SiMe_3$, viscosity 30 centipoises), referred to as H-siloxane, hereinafter, (4-2) ethynyl cyclohexanol, referred to as inhibitor, hereinafter, and (4-3) Cat-PL-50T (trade name by Shin-Etsu Chemical Co., Ltd., toluene solution of chloroplatinic acid-divinyltetramethyldisiloxane complex), referred to as Pt catalyst, hereinafter, or (4-4) C-1 (trade name by Shin-Etsu Chemical Co., Ltd., polysiloxane containing 50% benzoyl peroxide), referred to as organic peroxide, hereinafter.

Example 1

To 35 parts of silicone gum was added a mixture of 72 parts of a 60% toluene solution of MQ resin (net weight of polysiloxane 43 parts) and 38 parts of toluene. This was heated and agitated at 110° C. for 6 hours and then cooled, yielding a viscous solution.

With 145 parts of the solution was mixed 20 parts of the gold-plated silica powder (Synthesis Example 4). This was further mixed with 1.5 parts of (4-1) H-siloxane, 0.5 part of (4-2) inhibitor and 0.3 part of (4-3) Pt catalyst to form a conductive silicone pressure-sensitive adhesive composition having a non-volatile content of 60%.

The conductive adhesive composition was applied to a copper foil backing of 18 μm thick and 25 mm wide so as to give a dry film thickness of 40 μm, and heated at 120° C. for one minute for curing, producing a copper foil-based pressure-sensitive adhesive tape. The performance of conductive pressure-sensitive adhesive was evaluated by testing the conductive silicone pressure-sensitive adhesive composition and the pressure-sensitive adhesive tape according to the test methods of determining the processability, adhesive properties and conductivity of conductive pressure-sensitive adhesive, to be described later. The results are shown in Table 1.

Example 2

A conductive silicone pressure-sensitive adhesive composition having a non-volatile content of 60% was prepared by the same procedure as in Example 1 except that 2.0 part of (4-4) organic peroxide (1.0 part as 100% benzoyl peroxide) was used instead of the combination of H-siloxane, inhibitor and Pt catalyst.

The conductive adhesive composition was applied to a copper foil backing of 18 μm thick and 25 mm wide so as to give a dry film thickness of 40 μm, and heated at 165° C. for 5 minutes for curing, producing a copper foil-based pressure-sensitive adhesive tape. The performance of conductive pressure-sensitive adhesive was evaluated by the same test methods as in Example 1. The results are shown in Table 1.

Examples 3–6 and Comparative Examples 1–3

Conductive silicone pressure-sensitive adhesive compositions of the formulation shown in Table 1 and pressure-sensitive adhesive tapes were prepared as in Example 1 except that the curing conditions were changed as shown in Table 1. The performance of conductive pressure-sensitive adhesive was evaluated by the same test methods as in Example 1. The results are shown in Table 1.

Processability (Applicability)

The composition immediately after preparation and after 1 week aging was coated by means of an applicator. The outer appearance, dispersed state and ease of film formation were examined whereby the composition was evaluated in four ratings according to the following criterion.
  ⊚: excellent, completely dispersed
  ○: satisfactory, dispersed, but some precipitates
  Δ: fair, precipitates and upper separation
  X: poor, completely separated Conductivity (Resistivity)

The conductive silicone pressure-sensitive adhesive composition solution was applied to a copper foil backing of 18 μm thick and 25 mm wide by means of an applicator, so as to give a cured film thickness of 40 gm, and heat cured to produce a pressure-sensitive adhesive tape. A gold-plated copper plate electrode of 10 mm×10 mm was attached to the adhesive surface of the tape. The electric resistance between the electrode and the rear side of the tape (i.e., uncoated copper foil) was determined by the four-terminal method of measuring a voltage upon conduction of a current flow of −10 mA to 10 mA. From the measured resistance, the resistivity was calculated on the premise that the electrode area was 1 $cm^2$ and the electrode-to-electrode distance was 40 μm.

Conductivity (Rubber Contact Resistance)

The conductive silicone pressure-sensitive adhesive composition solution was applied to a connector-forming conductive silicone rubber sheet X-30-3323A of 2 mm thick by means of a rod coater, so as to give a cured film thickness of 40 μm, and cured to produce a pressure-sensitive adhesive silicone rubber sheet. A gold-plated copper plate electrode of 10 mm×10 mm was attached to the adhesive surface of the silicone rubber sheet. The electric resistance between the electrode and the rear side of the silicone rubber sheet (i.e., uncoated rubber sheet) was measured. The resistance of the pressure-sensitive adhesive silicone rubber sheet was measured immediately after preparation (initial) and after holding at 200° C. for 24 hours, 100 hours and 200 hours. Note that the resistance of the conductive silicone rubber sheet X-30-3323A (before coating of the conductive silicone pressure-sensitive adhesive composition) was 1.5 mΩ and remained unchanged after 200 hours of holding at 200° C.

300 mm/min while a peeling force (N/25 mm) was measured.

Also, the pressure-sensitive adhesive tape was attached to one end portion of a stainless steel plate over a bonded area of 25 mm×25 mm. The stainless steel plate was supported upright, with the adhesive tape suspended down, and a weight of 1 kg was connected to the lower end of the adhesive tape. The test assembly was allowed to stand at 250° C. for one hour. The distance over which the adhesive tape was shifted was measured under a microscope.

TABLE 1

| Composition (pbw) | | Specific gravity | Example | | | | | | Comparative Example | | |
|---|---|---|---|---|---|---|---|---|---|---|---|
| | | | 1 | 2 | 3 | 4 | 5 | 6 | 1 | 2 | 3 |
| A | Silicone gum | 1.0 | 35 | 35 | 40 | 35 | 40 | 40 | 35 | 35 | 35 |
| B | MQ resin | 1.0 | 43 | 43 | 48 | 43 | 48 | 48 | 43 | 43 | 43 |
| C | Au-plated silica powder | 3.1 | 20 | 20 | 0 | 0 | 0 | 0 | 0 | 0 | 0 |
| | Ag-plated silica powder | 2.9 | 0 | 0 | 10 | 20 | 0 | 0 | 0 | 0 | 0 |
| | Ag-plated hollow glass powder | 1.1 | 0 | 0 | 0 | 0 | 10 | 10 | 0 | 0 | 0 |
| | Ag powder | 10.5 | 0 | 0 | 0 | 0 | 0 | 0 | 20 | 70 | 0 |
| | Ag-plated glass powder | 2.7 | 0 | 0 | 0 | 0 | 0 | 0 | 0 | 0 | 20 |
| D | H-siloxane | 1.0 | 1.5 | 0 | 1.5 | 1.5 | 1.5 | 0 | 1.5 | 1.5 | 1.5 |
| | Pt catalyst | 0.9 | 0.3 | 0 | 0.3 | 0.3 | 0.3 | 0 | 0.3 | 0.3 | 0.3 |
| | Inhibitor | 1.0 | 0.5 | 0 | 0.5 | 0.5 | 0.5 | 0 | 0.5 | 0.5 | 0.5 |
| | Organic peroxide | 1.0 | 0 | 2 | 0 | 0 | 0 | 2 | 0 | 0 | 0 |
| Toluene | | 0.9 | 67 | 67 | 67 | 67 | 67 | 67 | 67 | 67 | 67 |
| Curing conditions | | | 120° C./ 1 min | 165° C./ 5 min | 120° C./ 1 min | 120° C./ 1 min | 120° C./ 1 min | 165° C./ 5 min | 120° C./ 1 min | 120° C./ 1 min | 120° C./ 1 min |
| wt % of conductive powder | | | 20% | 20% | 10% | 20% | 10% | 10% | 20% | 47% | 20% |
| vol % of conductive powder | | | 8% | 8% | 4% | 8% | 10% | 10% | 2% | 8% | 8% |
| Film thickness | | | 40 μm | 40 μm | 40 μm | 40 μm | 40 μm | 40 μm | 40 μm | 40 μm | 40 μm |
| Processability | | | | | | | | | | | |
| Applicability (initial) | | | ◎ | ◎ | ◎ | ◎ | ◎ | ◎ | Δ | Δ | ◎ |
| Applicability (1 week) | | | ○ | ○ | ○ | ○ | ◎ | ◎ | X | X | ○ |
| Adhesive properties | | | | | | | | | | | |
| Adhesion (N/25 mm) | | | 9.0 | 10.0 | 9.0 | 7.0 | 6.5 | 9.0 | 9.0 | 3.5 | 7.0 |
| Holding power (mm) | | | 0.01 | 0.10 | 0.00 | 0.01 | 0.00 | 0.15 | 0.01 | fall off | 0.01 |
| Conductivity | | | | | | | | | | | |
| Resistivity (Cu foil) (Ω · cm) | | | 1.3 | 1.4 | 5.5 | 1.0 | 0.8 | 0.9 | 50.0 | 1.3 | 2.3 |
| Rubber contact resistance (mΩ) initial | | | 15 | 25 | 50 | 10 | 8 | 12 | 1 k | 12 | 25 |
| 24 hr/200° C. | | | 15 | 25 | 70 | 15 | 10 | 18 | 10 k | 18 | 100 k |
| 100 hr/200° C. | | | 15 | 26 | 100 | 30 | 20 | 25 | 50 k | 35 | insulating |
| 200 hr/200° C. | | | 15 | 28 | 150 | 50 | 30 | 50 | 100 k | 55 | insulating |
| Overall evaluation | | | | | | | | | | | |
| Processability | | | ○ | ○ | ○ | ○ | ◎ | ◎ | X | X | ○ |
| Adhesive properties | | | ◎ | ◎ | ◎ | ◎ | ◎ | ◎ | ◎ | X | ◎ |
| Conductivity | | | ◎ | ◎ | ○ | ○ | ○ | ○ | X | ○ | X |

Note that "overall evaluation" in Table 1 was made according to the following criterion by combining the tested factors in each of processability, adhesive properties and conductivity.
◎: excellent
○: good
Δ: fair
X: poor Adhesive Properties (Adhesion and Holding Power)

A pressure-sensitive adhesive tape prepared as in the evaluation of conductivity was attached to a silicone rubber sheet. A rubber-covered roller covered with a rubber sleeve and having a weight of 2 kg was rolled thereon once back and forth for press laminating the tape to the sheet. The assembly was allowed to stand at room temperature for about 20 hours. Thereafter, using a tensile tester, the adhesive tape was turned back 180° and pulled away at a rate of As a result of evaluation in four ratings, the conductive silicone pressure-sensitive adhesive compositions of Examples were evaluated excellent or good in all of processability, adhesive properties and conductivity whereas Comparative Examples were rejected in at least one of these tests.

There has been described a conductive silicone pressure-sensitive adhesive composition which has satisfactory adhesion to silicone rubber or the like and cures into a product that exhibits stable conductivity and adhesive properties in the temperature region where silicone rubber is used. The inventive composition is suited for use in high-reliability electronic material application.

Japanese Patent Application No. 2002-258601 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An electroconductive silicone pressure-sensitive adhesive composition, comprising:
   (A) 100 parts by weight of an organopolysiloxane having the average formula (1):

$$R_aSiO_{(4-a)/2} \quad (1)$$

wherein R is independently a substituted or unsubstituted monovalent hydrocarbon radical having 1 to 10 carbon atoms, and "a" is a positive number of 1.95 to 2.05;
   (B) 50 to 250 parts by weight of an organopolysiloxane comprising structural units of the formula (2):

$$R^1{}_3SiO_{1/2} \quad (2)$$

wherein $R^1$ is independently a hydroxyl radical or a substituted or unsubstituted monovalent hydrocarbon radical having 1 to 10 carbon atoms and $SiO_{4/2}$ units, in a molar ratio $(R^1{}_3SiO_{1/2})/(SiO_{4/2})$ ranging from 0.5 and 1.2;
   (C) 3 to 300 parts by weight per 100 parts by weight of components (A) and (B) combined of an electroconductive powder comprising core particles of an inorganic material or organic resin which are surface coated with a layer of a silicon-base polymer having reductive effect or a partially or entirely ceramic layer thereof, which is in turn surface coated with a metal by plating; and
   (D) an effective amount to cure component (A) of a crossinking agent.

2. The electroconductive silicone pressure-sensitive adhesive composition of claim 1, wherein, in the electroconductive powder (C), the core particles are made of an inorganic material having a specific gravity of up to 3.5 and are coated on their outermost surfaces with a noble metal.

3. The electroconductive silicone pressure-sensitive adhesive composition of claim 2, wherein the noble metal is selected from the group consisting of silver, gold, palladium and platinum.

4. The electroconductive silicone pressure-sensitive adhesive composition of claim 1, wherein the crosslinking agent (D) comprises an organohydrogenpolysiloxane containing at least two silicon atom-bonded hydrogen atoms in a molecule and a platinum group catalyst, or an organic peroxide.

5. The electroconductive silicone pressure-sensitive adhesive composition of claim 1, wherein the core particles have an average particle size ranging from 0.1 to 500 μm.

6. The electroconductive silicone pressure-sensitive adhesive composition of claim 5, wherein the core particles have an average particle size ranging from 1 to 100 μm.

7. The electroconductive silicone pressure-sensitive adhesive composition of claim 1, wherein the surface coating of metal is a metal selected from the group consisting of at least one of nickel, copper, silver, cobalt, tungsten, iron, zinc, gold and platinum or Ni—P.

8. The electroconductive silicone pressure-sensitive adhesive composition of claim 1, wherein the surface coating of metal has a thickness ranging from 0.01 to 10.0 μm.

9. The electroconductive silicone pressure-sensitive adhesive composition of claim 1, wherein the amount of resin organopolysiloxane component (B) that is combined with organopolysiloxane component (A) ranges from 50 to 250 parts by weight of (B) per 100 parts by weight of (A).

10. The electroconductive silicone pressure-sensitive adhesive composition of claim 1, wherein the amount of resin conductive powder component (C) that is combined with organopolysiloxane components (A) and (B) ranges from 3 to 300 parts by weight of (C) per 100 parts by weight of (A) and (B).

11. The electroconductive silicone pressure-sensitive adhesive composition of claim 1, wherein the organohydrogenpolysiloxane crosslinking agent has the formula:

$$R^6{}_sH_tSiO_{(4-s-t)/2}$$

wherein $R^6$ is independently a substituted or unsubstituted monovalent $C_{1-10}$ hydrocarbon group, $0 \leq s < 3$, $0 < t < 3$ and $0 < s+t < 3$.

12. The electroconductive silicone pressure-sensitive adhesive composition of claim 1, wherein R of formula (1) is alkyl, cycloalkyl, alkenyl, aryl or aralkyl.

13. The electroconductive silicone pressure-sensitive adhesive composition of claim 1, wherein organopolysiloxane component (A) has a degree of polymerization of at least 100.

14. The electroconductivesilicone pressure-sensitive adhesive composition of claim 1, wherein the molar ratio of component (B) ranges from 0.65 to 0.95.

15. The electroconductive silicone pressure-sensitive adhesive composition of claim 1, wherein the silicon-based polymer that has a reductive effect has the formula:

$$(R^2{}_bR^3{}_cX_dSi)_e \quad (3)$$

wherein each of $R^2$ and $R^3$ is hydrogen or a substituted or unsubstituted monovalent hydrocarbon group, X is defined as $R^2$, an alkoxy radical, halogen, oxygen, or nitrogen $0.1 \leq b \leq 2$, $0 \leq c \leq 1$ and $0 \leq d \leq 0.5$ and $1 \leq b+c+d \leq 2.5$ and e ranges from 4 to 100,000.

* * * * *